March 11, 1930.    A. P. HARRISON    1,750,267
AUTOMATIC FERMENTATION APPARATUS
Filed June 9, 1927
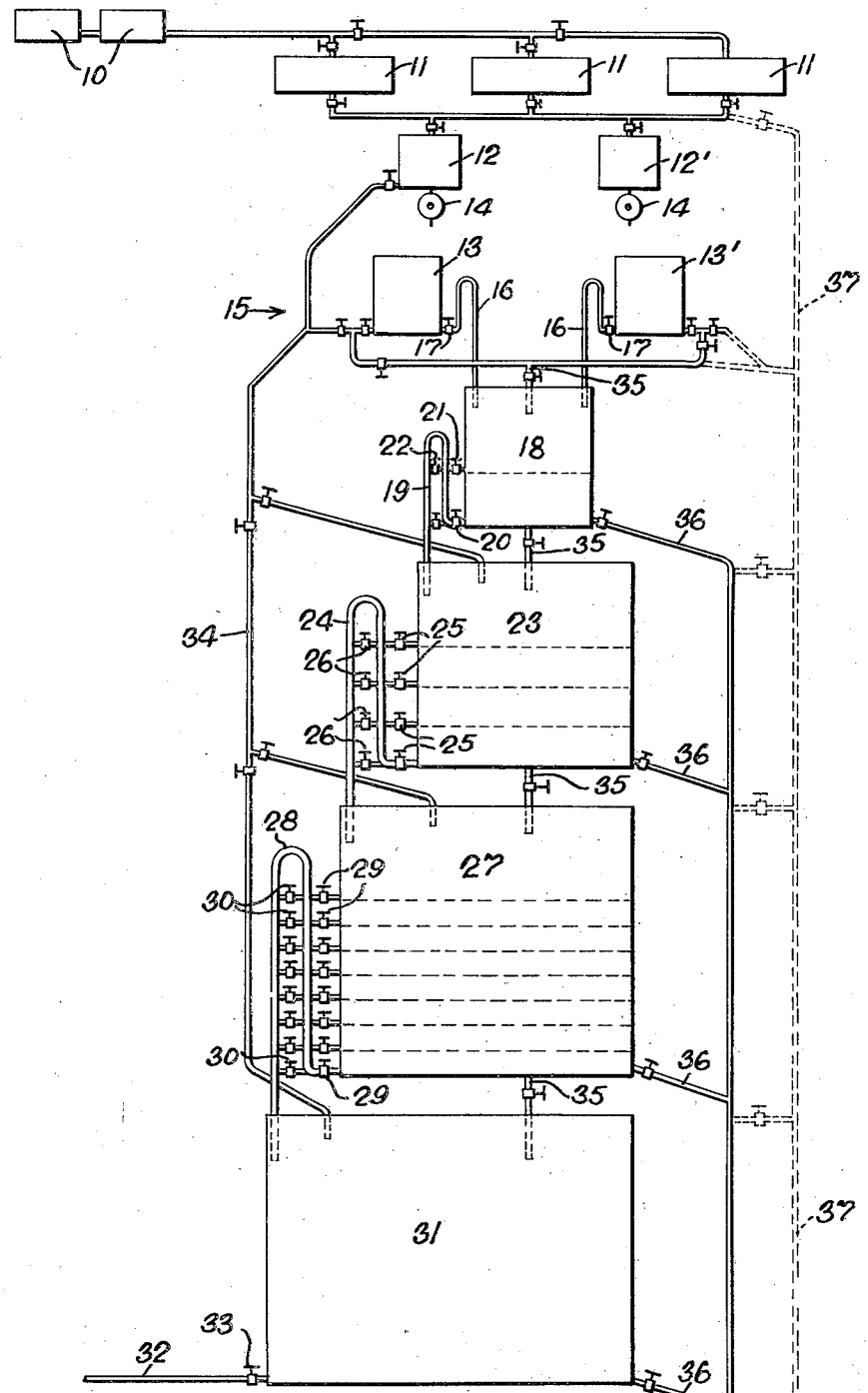
INVENTOR.
Arthur P. Harrison
BY
Mayer, Warfield & Watson
ATTORNEYS.

Patented Mar. 11, 1930

1,750,267

UNITED STATES PATENT OFFICE

ARTHUR PENNOYER HARRISON, OF WASHINGTON, DISTRICT OF COLUMBIA, ASSIGNOR, BY MESNE ASSIGNMENTS, TO STANDARD BRANDS INCORPORATED, OF DOVER, DELAWARE, A CORPORATION OF DELAWARE

AUTOMATIC FERMENTATION APPARATUS

Application filed June 9, 1927. Serial No. 197,547.

This invention relates to the manufacture of yeast, especially bakers' yeast, and more particularly to these processes of manufacturing yeast known as "addition" processes, in which during at least a portion of the propagating period nutrients in solution are fed to the seed yeast at a rate approximating the rate of assimilation of the nutrients.

An object of this invention is to provide an improved apparatus for the manufacture of yeast in an efficient, convenient and economical manner, whereby the necessity for manual control of the operations during the propagation is minimized, and the process may in fact be rendered at least semi-automatic.

Other objects of the invention will in part be obvious and will in part appear hereinafter.

The invention accordingly comprises the features of construction, combinations of elements and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which is shown diagrammatically a system constructed in accordance with the principles of the present invention and adapted for the manufacture of yeast.

It will be understood that the apparatus shown may be used in conjunction with any type of yeast nutrient solution or with any of the refinements of control of acidity and the like which are or may be well known to the art. The apparatus is also adaptable to either a "continuous-addition" or to a "continuous-addition-withdrawal" type of process, such as are shown in Hayduck Patents Nos. 1,449,107 and 1,449,108.

In the exemplification of the apparatus shown in the drawing, a gang of five fermenters in series is shown, although this series may be of greater or less length, as desired. The mash is prepared in the usual manner in the mash tubs 10, and is passed through the filters 11, the wort being collected in reserve tanks 12 and 12'. From the reserve tanks, the reserve wort passes slowly through suitable flow control devices 14, such as appropriate meters, into the first fermenters 13 and 13'.

The seed yeast is initially suspended either in water or in a dilute nutrient solution, in fermenters Nos. 1 and 1—A respectively comprised by tanks 13 and 13', and while this suspension is aerated the reserve wort from tanks 12 and 12' is slowly and continuously added thereto at a rate approximately equal to that of the attenuation by the yeast. These first fermenters, as well as the other fermenters which are in the gang, are equipped with suitable means for forcing air through the propagating liquid, as is indicated diagrammatically by the pipe system 15.

In the preferred method of using this apparatus, the propagation of yeast in fermenters Nos. 1 and 1—A is staggered in a manner such that at the time one thereof is being filled, the other will be emptying into the succeeding fermenter No. 2. Such emptying is accomplished more or less automatically by means of the take-off pipes 16, which as illustrated are in the form of a siphon, the top of the bend being at a height such that at the time the siphon begins to operate the corresponding fermenter No. 1 or 1—A will be approximately full of yeast-containing liquid.

The rate of flow of these take-off pipes is preferably controlled by means of suitable valves 17, although regulation may also be accomplished by a choice of the correct size of piping. Also, although the take-off pipes are shown connected to the bottom of the fermenters, they may if desired be passed through the fermenter at the U-shaped bend, or the U may be positioned wholly inside of the fermenter, with the long arm projecting through the bottom. In either case the short arm thereof should approximately extend to the bottom of the tank. These remarks apply equally to the corresponding take-off pipes hereinafter referred to as connected with subsequent fermenters in the series.

The next fermenter in the series, which has been referred to as fermenter No. 2, comprises a tank 18 which is preferably of a capacity sufficient to hold conveniently the contents of two fermenters of the size of fermenter No. 1—the capacity thereof prior to emptying being likewise normally controlled by the height of the U-shaped bend of the take-off pipe designated as 19. This pipe is controlled by a valve 20, and is of a size such that it will empty fermenter No. 2 in the same time that one of the take-off pipes 16 will empty its fermenter. Also if desired fermenter No. 2 may be equipped with valves 21 and 22 which, as will be readily understood, may allow either the upper half of the liquid to be withdrawn or may allow the siphon to operate to withdraw all of the liquid from the tank when it has reached a height approximating half of its normal capacity.

To avoid needless repetition it is here pointed out that each of the intermediate fermenters subsequently in series are similarly equipped with take-off pipes and valves bridging across the same, whereby an aliquot of ½, ¼, ⅛, etc., of the liquid may be removed from the tank as desired. For example, fermenter No. 3, comprising a tank 23, is double the capacity of the tank 18, and is equipped with take-off pipe 24, which is of a size such that the contents of the tank 23 may be removed twice as rapidly, i. e., in the same time as the contents of the preceding tank. This take-off pipe and tank are also equipped with valves 25 and 26. Similarly fermenter No. 4, comprising tank 27, is double the capacity of tank 23 and is equipped with a correspondingly larger take-off pipe 28, and in turn are equipped with valves 29 and 30.

The last fermenter in the series, which is here shown as fermenter No. 5, is comprised of the tank 31. Instead of the usual form of take-off pipe, this fermenter is equipped merely with a withdrawal pipe 32, by which the yeast-containing liquid is removed therefrom to a receiving tank acting as a reservoir for the yeast separators. The rate of flow to this reservoir is controlled by the valve 33.

As will be readily understood by one skilled in the art, it is sometimes necessary, in conducting processes of propagation of the type herein dealt with, to vary the usual course of the wort or propagating liquid through the apparatus, and for this reason the various fermenters subsequent to fermenter No. 1 are equipped with an auxiliary feed supply system 34, by which reserve nutrient liquid may be selectively added to any fermenter without first having passed through the previous fermenters in the system. Likewise, each fermenter except the last of the series is equipped with a take-off pipe 35 at the bottom thereof leading directly to the next succeeding fermenter, and all are equipped with a take-off pipe 36 at the side thereof, which leads to a safety reservoir which may be used when necessary. The entire system is also equipped with a drain system 37, which may be used to facilitate washing and sterilization after and prior to the use of the apparatus.

The manner of using this apparatus will be readily apparent to one skilled in the art. Briefly, it might be stated that the necessary amount of seed yeast is added each time a new propagation is initiated in one of the fermenters Nos. 1 and 1—A. This new charge of seed yeast then passes on through the system and aids materially in maintaining the stability of the yeast. Additional seed yeast may be added, if desired, to any other fermenter to assist in maintaining such stability.

In those "continuous-addition-withdrawal" processes of manufacturing yeast heretofore known, the conditions have been such that a certain proportion of the original seed yeast has remained in the fermenter throughout the period of propagation. In the present process, however, under normal operation the second emptying of any fermenter trips the siphon which empties the succeeding fermenter completely before another charge is received from the first-mentioned fermenter. It will thus be seen that for any given fermenter in the series there is, at periodic intervals, a complete renewal of the yeast stock, thus assuring a supply of relatively young yeast for propagating purposes. Furthermore, by a proper timing of the operations, the apparatus can be run continuously while allowing for cleaning and sterilizing each of the fermenters at certain intervals when it becomes empty.

Also when used as described the apparatus permits a series of intermittent continuous processes of propagation to be carried out in a manner such that in any fermenter the ratio of the density of the incoming nutrient liquid to the removed yeast-containing liquid is less than the density ratios of these liquids in the preceding fermenter. This tends to insure a rapid and thorough assimilation of the nutrients in the wort and results in a consequent high yield of yeast of good color, baking and keeping qualities.

In the present exemplification the fermenters have been shown diagrammatically as positioned one below the other. Obviously, however, the position thereof may be varied as desired, the units being placed on progressively lower levels or even on substantially the same level. In the latter case the take-off pipes will not operate as siphons to empty completely their respective fermenters, but the yeast-containing liquid will pass from one fermenter to the next as the head of liquid is increased therein by the addition of yeast nutrients in the preceding fermenter, and the withdrawal of yeast-containing liquid from the last of the series of fermenters. The positioning of the end of each take-off pipe substantially at the bottom of the fermenter from which it receives liquid insures that the yeast content of the yeast-containing liquid drawn off therethrough is uniformly representative of the yeast content of the propagating liquid in the fermenter.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. An apparatus for manufacturing yeast by propagation by an "addition" process, including a fermenter, a take-off pipe establishing a liquid level therein and having an arm extending substantially to and ending at the bottom of the fermenter, a second fermenter so disposed with respect to the other end of said take-off pipe as to receive therefrom the contents of the first fermenter, said take-off pipe being adapted to act as an intermittent siphon during the propagating period.

2. An apparatus for manufacturing yeast by propagation by an "addition" process, including a series of fermenters arranged at slightly different and progressively lower levels, a take-off pipe connected to each and leading to the succeeding fermenter, each of said take-off pipes having a bend establishing the maximum liquid level in the fermenter to which it is connected and having an arm extending approximately to the bottom of said fermenter; said take-off pipes being adapted to act as intermittent siphons during the propagating period.

3. An apparatus for manufacturing yeast by propagation by an "addition" process, including a series of fermenters arranged at different and progressively lower levels, a take-off pipe connected to each and leading to the succeeding fermenter, each of said take-off pipes being substantially in the form of an inverted U and having arms of unequal length, the short arm being connected to the preceding fermenter and reaching to approximately the bottom thereof, the bend of said U establishing the maximum liquid level in the fermenter to which it is connected; said take-off pipes being adapted to act as intermittent siphons during the propagating period.

4. An apparatus for manufacturing yeast by propagation by an "addition" process, including a series of fermenters arranged at different and progressively lower levels, a take-off pipe connected to each and leading to the succeeding fermenter, each of said take-off pipes being substantially in the form of an inverted U and having arms of unequal length, the short arm being connected to the preceding fermenter and reaching to approximately the bottom thereof, the bend of said U establishing the maximum liquid level in the fermenter to which it is connected, each fermenter of the series being of approximately double the capacity of the next preceding fermenter; said take-off pipes being adapted to act as intermittent siphons during the propagating period.

5. An apparatus for manufacturing yeast by propagation by an "addition" process, including a series of fermenters arranged at different and progressively lower levels, a take-off pipe connected to each and leading to the succeeding fermenter, each of said take-off pipes being substantially in the form of an inverted U and having arms of unequal length, the short arm being connected to the preceding fermenter and reaching to approximately the bottom thereof, the bend of said U establishing the maximum liquid level in the fermenter to which it is connected, each fermenter of the series being of approximately double the capacity of the next preceding fermenter, said take-off pipes having capacities respectively sufficient to empty the fermenters to which they are attached in the same period of time.

6. An apparatus for manufacturing yeast by propagation by an "addition" process, including a series of fermenters arranged at different and progressively lower levels, a take-off pipe connected to each and leading to the succeeding fermenter, each of said take-off pipes being substantially in the form of an inverted U and having arms of unequal length, the short arm being connected to the preceding fermenter and reaching to approximately the bottom thereof, the bend of said U establishing the maximum liquid level in the fermenter to which it is connected, each fermenter of the series being of approximately double the capacity of the next preceding fermenter, certain of said take-off pipes and fermenters being equipped with communicating pipes equipped with valves whereby an aliquot of the liquid may be removed therefrom without respect to the height of the U-shaped bend of the take-off pipe.

7. An apparatus for manufacturing yeast by propagation by an "addition" process, including a series of fermenters arranged at different and progressively lower levels, a take-off pipe connected to each and leading to the succeeding fermenter, each of said take-off pipes being substantially in the form of an inverted U and having arms of unequal length, the short arm being connected to the preceding fermenter and reaching to approximately the bottom thereof, the bend of said U establishing the maximum liquid level in the fermenter to which it is connected, and means independently to supply yeast nutrients in solution to each fermenter; said take-off pipes being adapted to act as intermittent siphons during the propagating period.

8. An apparatus for manufacturing yeast by propagation by an "addition" process, including a series of fermenters arranged at different and progressively lower levels, a take-off pipe connected to each and leading to the succeeding fermenter, each of said take-off pipes being substantially in the form of an inverted U and having arms of unequal length, the short arm being connected to the preceding fermenter and reaching to approximately the bottom thereof, the bend of said U establishing the maximum liquid level in the fermenter to which it is connected, each fermenter of the series being of approximately double the capacity of the next preceding fermenter, certain of said take-off pipes and fermenters being equipped at various levels with a short pipe leading from the fermenter to the short arm of the U and at substantially the same level from the short arm of the U to the long arm of the U, each of said short pipes being equipped with valves whereby an aliquot of the liquid may be removed therefrom without respect to the height of the U-shaped bend of the take-off pipe.

In testimony whereof I affix my signature.

ARTHUR PENNOYER HARRISON.